Figure 1:
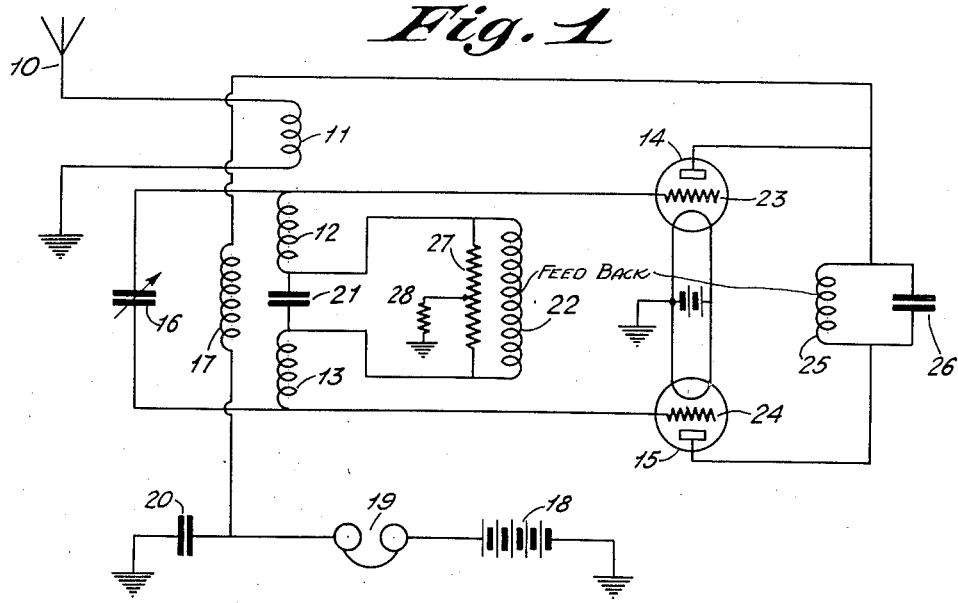

April 7, 1936.  R. W. GEORGE  2,036,690
SUPERREGENERATIVE RECEIVER
Filed Jan. 29, 1932  2 Sheets-Sheet 1

INVENTOR
R. W. GEORGE
BY
ATTORNEY

INVENTOR
R. W. GEORGE
BY
ATTORNEY

Patented Apr. 7, 1936

2,036,690

UNITED STATES PATENT OFFICE 2,036,690

SUPERREGENERATIVE RECEIVER

Ralph W. George, Riverhead, N. Y., assignor to Radio Corporation of America, a corporation of Delaware Application January 29, 1932, Serial No. 589,545

19 Claims. (Cl. 250—20)

This invention relates to regenerative receiving systems, and more particularly to an improved type of super-regenerative receiving circuit.

In United States Patent No. 1,982,694, granted December 4, 1934 to Walter Van B. Roberts, there is disclosed a method of securing high amplification in a super-regenerative system without building up sustained oscillations. Briefly, the method disclosed in the aforementioned patent comprises periodically reversing the phase of the feed-back in the system for rapidly quenching radio frequency oscillations during the damping period. The particular embodiment disclosed therein consists of a pair of space discharge devices, one of the devices intermittently functioning as an oscillator generator, the other tube intermittently and alternately with the first tube acting to quench oscillations prior to the instant when oscillations built up by the oscillator generator would otherwise attain an undesirable amplitude.

In United States Patent No. 1,948,315, granted June 12, 1931, to Walter Van B. Roberts, there are disclosed various other embodiments for producing super-regeneration in a receiving system having a pair of oppositely connected space discharge devices, the basic method employed in each of these latter embodiments consisting in applying both signal energy and a low frequency interrupting voltage simultaneously to the devices in a differential manner, the common output circuit of the devices being coupled to the common input circuit of the said devices. From one aspect the embodiments disclosed in this patent can be considered as balanced modulator circuits, wherein there are provided a signal collecting circuit, and a relatively low frequency modulating voltage source, and additional means for feeding back to the signal circuit the side bands at radio frequencies produced by modulation of signal voltages.

In effect, the foregoing disclosures describe a super-regenerative arrangement wherein a source of interrupting frequency is coupled directly across the input of a pair of oppositely connected space discharge devices, and wherein a common feed-back reactance in the common output circuit of the arrangement is utilized to couple the common output circuit to reactances in the common input circuit of the discharge devices. While various advantages have been stated as being secured by means of such a super-regenerative embodiment it has been found that further experimentation and development of this type of super-regenerative circuit has resulted in additional advantages.

A primary object of the present invention is to enable the reception of signals by super-regenerative means without the employment of a separate quenching frequency oscillator. This object is accomplished in the present invention by providing a special quenching frequency oscillator circuit which functions independently of the super-regenerative circuit while using the same tubes, thus eliminating the need for a separate source of quenching oscillations.

A further object of this invention is to provide a super-regenerative circuit which is less complicated and more suitable for operation than those heretofore employed.

A feature of the invention is the common biasing arrangement for both the regenerative and the degenerative tubes, the latter of which acts as a low frequency oscillator. This arrangement eliminates the critical biasing adjustment which is characteristic of the aforementioned super-regenerative circuits.

Another feature of this invention is the coupling arrangement between the common output and input circuits of the two tubes.

Figure 3:
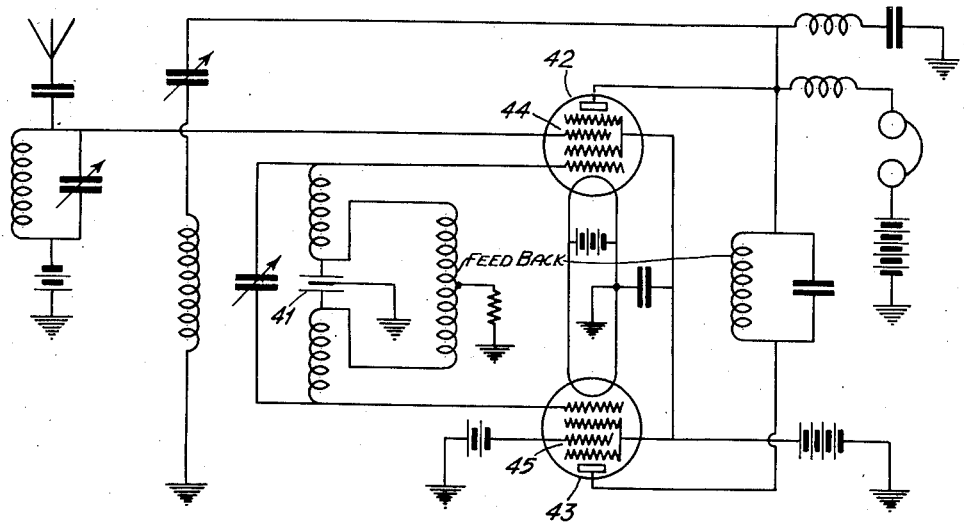
Figure 2:
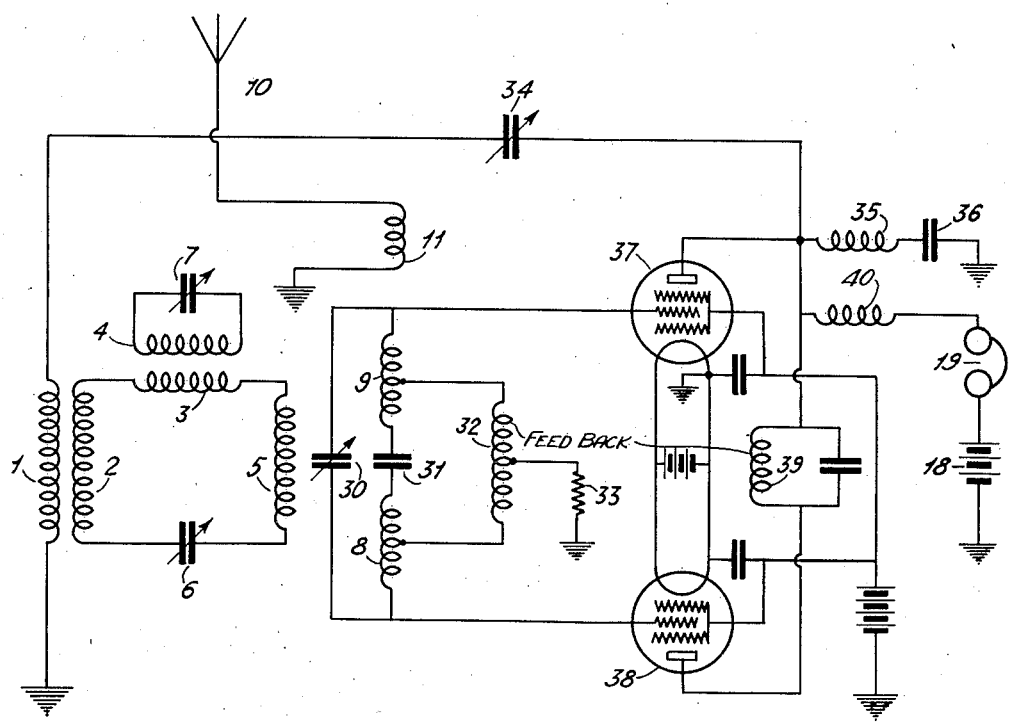
Figure 2A:
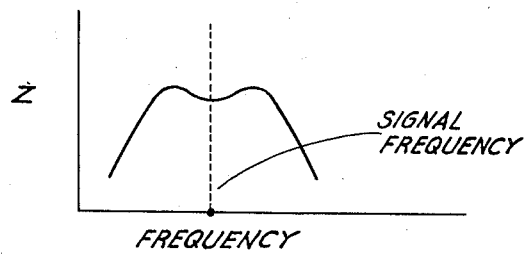

A better understanding of this invention may be had from the following description which is accompanied by drawings, wherein Figure 1 illustrates, diagrammatically, a super-regenerative receiver circuit embodying the principles of this invention, and Figure 2 illustrates a modification thereof. Figure 2A is a graph explanatory of the operation of the filter action of the circuit of Figure 2, and Figure 3 shows a further modification of this invention.

Referring to Figure 1, there is shown a multi-tube super-regenerative circuit of the type wherein an electron discharge device is coupled to the input circuit to give regeneration and another device coupled to the input circuit to give degeneration, each device functioning alternately. Signal waves arriving at the station are received over antenna 10 which is connected to input coil 11, in turn, coupled to oppositely disposed electron discharge devices 14 and 15 through coils 12 and 13. Coils 12 and 13, together with variable condenser 16, comprise the input circuit of the tubes 14 and 15, tuned to the incoming signal frequency, which circuit hereinafter will be called the high frequency circuit. Regeneration is obtained by means of a feed-back coil 17 which is connected to the common output circuit of tubes 14 and 15 and coupled to the high frequency circuit 12, 13, 16. Positive potential is applied to the anodes of the electron discharge devices from battery 18 through signal utilization means 19 and feed-back coil 17 connected in series. By-pass condenser 20 is designed to have a relatively low impedance and functions to eliminate the undesired high frequency currents from the headphones 19 and from the low frequency circuit 25, 26.

Serially connected with coils 12 and 13 is a condenser 21 which, in combination with inductance coil 22, comprises the low frequency circuit disposed between grids 23 and 24 of the two tubes 14 and 15. In shunt to coil 22 is a resistor 27 to the center point of which is connected a grid leak 28. It will be noted that the capacity to ground of the apparatus in this arrangement contributes to the proper grounding of the circuit, whereby the low frequency circuit is sufficiently grounded to permit the operation of the circuit as a low frequency oscillator in the conventional manner. Coupled to inductance coil 22 there is shown an inductance coil 25 which, together with a condenser 26, forms a low frequency resonant circuit in the common output circuit of tubes 14 and 15. Condensers 21 and 26 are each of relatively high capacity and consequently present a low impedance to the signal frequency. Coils 22 and 25, on the other hand, each present a high impedance to the signal frequency.

Thus, coil 25 and condenser 26 provide a circuit which is almost a short circuit for high signal frequencies and which acts as a coupling resonant circuit for the low or quenching frequencies generated by electron discharge device 15. Similarly, the circuit combination of coil 22 and condenser 21 presents a very low impedance to high frequencies and acts as a resonant circuit for the low quenching frequencies.

Electron discharge device 15 produces the low frequency oscillations and is arranged to supply the power to make the two low frequency circuits 25, 26 and 21, 22 oscillate. This occurs by virtue of the low frequency feed-back between coils 25 and 22. The feed-back necessary to build up and sustain oscillations is obtained not only by the coupling between coils 22 and 25, but also by the inherent regenerative feed-back coupling due to the capacity between the plate and grid of the tube 15. In most respects the operation of this low frequency oscillator is identical with that of the conventional single tube oscillator with tuned plate and tuned grid circuits. Electron discharge device 14, on the other hand, is arranged to give regeneration and has little or no effect on the low frequency circuit 25, 26 at its resonant low quenching frequency since the anode circuit of tube 14 is connected to ground by condenser 20.

Low frequency oscillations in the circuit 21, 22 which are set up in the manner just described, impress the quenching voltage across condenser 21 which quenching voltage is, in turn, impressed on the grids 23 and 24 through the coils 12 and 13. The presence of the low frequency resonant circuit 25, 26 between the two anodes of tubes 14 and 15, has no detrimental action at the high signal frequency because of its low impedance to these relatively high frequencies due, in part, to the relatively large capacity of the condenser 26. Essentially, this circuit is similar in many respects to that described in the aforementioned United States Patent No. 1,948,315, with the addition of a low frequency resonant circuit 25, 26 which is coupled to the low frequency resonant circuit 21, 22.

In Figure 2 is shown a modification of the circuit of Figure 1. This circuit operates in the same manner as the circuit in Figure 1. The band of frequencies to which the circuit of Figure 2 will respond is, however, greater than that to which the ordinary super-regenerative circuit will respond by virtue of the fact that the high frequency feed-back coil 1, (corresponding to coil 17 in Fig. 1), is coupled to the high frequency circuit coils 8 and 9 through a filter which passes maximum energy, feed-back in this case, at frequencies on either side of the signal frequency to which the high frequency circuit 8, 9, 30, 31 is tuned. This is equivalent to boosting the feed-back at frequencies either side of the signal frequency, thus broadening the frequency response of the receiver. Filter circuits 2, 3, 5, 6 and 4, 7 are both arranged to be independently tuned to the signal frequency and are coupled together through coils 3 and 4, as shown. A frequency response characteristic shown in Figure 2A is thus obtained causing an effect well known in the art. In the drawing of Figure 2A the ordinate Z (impedance) represents the feed-back energy.

In this embodiment, condenser 34 acts as a regeneration control by means of which the amount of high frequency energy fed to the feed-back coil 1 may be varied. Such control is especially advantageous when it is desired to keep the coupling between coils 1 and 2 fixed.

Other differences between the circuit of Figure 2 and that of Figure 1 are that the bias resistor 33 is connected directly to the center of the coil 32 instead of to an artificial center tap, and that a choke coil 40 is provided in series with the headphones 19 to prevent short circuiting of the high signal frequencies to ground. Circuit 35, 36 is a series resonant circuit tuned to the low quenching frequency for effectively tying the plate of screen grid tube 37 to ground with respect to the low frequency oscillator screen grid tube 38. This arrangement eliminates the low frequency currents from the headphones 19. Coil 35 acts as a choke for the high signal frequency currents.

The use of screen grid tubes in the embodiment of Figure 2 does not change the operation of the receiving circuit as compared with that of Figure 1 except that low frequency feed-back is now mainly dependent on the coupling between coils 32 and 39.

Figure 3 is a further modification of the present invention employing special screen grid tubes 42 and 43. In this particular arrangement condenser 41 intermediate the grid electrodes of the two tubes is grounded by means of a center tap to effectively balance the grid electrode circuits.

Tubes 42 and 43 are similar to the regular screen grid tubes except for the addition of screens 44 and 45. One of these grids, namely, 45, is not essential to the operation of the circuit, the other grid 44 being used to impress the incoming signal on the receiver instead of using the coupling coil which is shown in Figure 1. The shielding of this grid prevents the rapidly damped high frequency currents set up in the super-regenerative circuits from being fed to grid 44 and back to the input circuits. It is well known that such reaction from a super-regenerative receiver effectively damps tuned circuits which are designed to sharpen the frequency response of the receiver. The present arrangement should permit the use of any desired selectivity before the receiver.

It is to be understood, of course, that the present invention is not limited to the precise arrangements of parts shown since various modifications may be made without departing from the spirit and scope of the invention.

I claim:

1. In a super-regenerative receiving circuit, in combination, an input circuit for receiving incoming oscillations, two push-pull connected electron discharge devices coupled to said input circuit in opposite senses, said input circuit including a circuit resonant to the relatively high signal frequency and a circuit resonant to another lower quenching frequency, a common output circuit for said devices and another circuit in said output circuit resonant to said lower quenching frequency, said two low quenching frequency resonant circuits being coupled together, and signal utilization means connected to said output circuit.

2. In a super-regenerative receiving circuit, in combination, a plurality of electron discharge devices having anode, cathode and control electrodes, an input circuit coupled to the control electrodes of said devices including a signal collecting circuit for applying signal waves to said devices in a differential manner, an output circuit for said devices coupled to said input circuit by a feed-back coil, parallel resonant circuits in said input and output circuits which are resonant to a frequency lower than said signal frequency, and signal utilization means connected to said output circuit.

3. A super-regenerative receiving circuit comprising two electron discharge devices in push-pull relationship with respect to one another, having their respective corresponding grid, cathode and anode electrodes connected together, an input circuit, the grids of said devices being connected to said input circuit in a differential manner, a common output circuit for said devices coupled to said input circuit, a parallel tuned circuit in said output, said input circuit comprising two parallel tuned circuits resonant to different frequencies, each of said tuned circuits being arranged to affect the grids of said devices in different senses, and signal utilization means connected to said output circuit, one of said parallel tuned input circuits being resonant to the incoming signal frequency, the other of said parallel tuned input circuits being coupled to the parallel tuned circuit in said output.

4. A multi-tube super-regenerative receiving circuit of the type comprising two push-pull connected tubes having a common input circuit simultaneously impressing signal waves on both tubes in a differential manner, wherein one tube is arranged to give regeneration of the signal waves and the other tube arranged to quench the oscillations of said first tube, characterized in this, that the last mentioned tube comprises a quenching frequency oscillator whose output is electromagnetically coupled to said common input circuit.

5. In a super-regenerative receiving circuit, in combination, two push-pull connected electron discharge devices, an input circuit coupled to the signal control grids of said devices including a signal collecting circuit for applying signal waves to said devices in a differential manner, an output circuit for said devices coupled to said input circuit by a feed-back coil, and parallel resonant circuits in both said input and output circuits which present a low impedance to frequencies of the signal wave, said resonant circuits being resonant to a frequency different from the incoming signal frequency.

6. In a super-regenerative receiving circuit, in combination, two electron discharge devices having anode, cathode, and control electrodes, the respective corresponding electrodes of said two devices being connected together, at least one of said devices functioning as a regenerator of the received signal waves, a source of direct current for supplying energy for said anodes, a parallel resonant tuned circuit interposed between said anode electrodes, and a parallel resonant tuned circuit interposed between said control electrodes, said parallel tuned circuits being tuned to a frequency lower than the frequency of the signal waves and functioning periodically to control the length of time during which said regenerator is effective.

7. In a super-regenerative circuit, in combination, a plurality of electron discharge devices having anode, cathode and control electrodes, an input circuit coupled to the control electrodes of said devices including a signal collector for applying signal waves to the control electrodes in opposite senses, an output circuit connected to said anodes, and a feed back coil in said output circuit arranged to receive the total output radio frequency current from said anodes and coupled to said input circuit, and parallel resonant circuits in said input and output circuits which present a low impedance to frequencies of the signal waves.

8. In a super-regenerative receiving circuit, in combination, two electron discharge devices connected in push-pull relationship with respect to each other having anode, cathode and control electrodes, the respective corresponding electrodes of said two devices being connected together, a parallel resonant tuned circuit interposed between said respective anodes, and another parallel resonant circuit interposed between said control electrodes, said last resonant circuit comprising a condenser and an inductance coil, said inductance coil having in circuit therewith a biasing arrangement which is common to the control electrodes of both of said devices.

9. In a super-regenerative receiving circuit, in combination, two electron discharge devices connected in push-pull relationship with respect to each other, an input circuit for said devices including a signal collecting circuit coupled to said input circuit for applying signal waves to said devices in a differential manner, an output circuit for said devices coupled to said input circuit by a feed back coil, parallel resonant circuits in said input and output circuits which are resonant to a frequency lower than said signal frequency, said resonant circuit in the input circuit comprising a condenser and an inductance coil, said inductance coil having in circuit therewith a biasing arrangement which is common to the control electrodes of both of said devices.

10. In a super-regenerative circuit, in combination, a plurality of electron discharge devices having anode, cathode and control electrodes, an input circuit coupled to the control electrodes of said devices including a signal collector for applying signal waves to the control electrodes out of phase with respect to one another, an output circuit connected to said anodes, and a feed back coil in said output circuit arranged to receive the total output radio frequency current from said anodes and coupled to said input circuit, and parallel resonant circuits in said input and output circuits which present a low impedance to frequencies of the signal waves.

11. A super-regenerative receiving circuit comprising two electron discharge devices in push-pull relationship with respect to one another having their respective corresponding grid, cathode and anode electrodes connected together, an input circuit coupled to the grids of said devices for applying thereto signal waves in opposite senses, a common output circuit for said devices coupled to said input circuit, said input circuit comprising a plurality of parallel tuned circuits resonant to different frequencies, each of said tuned circuits being arranged to affect the grids of said devices in opposite senses, one of said tuned circuits being resonant to the incoming signal frequency, and a parallel tuned circuit in said output tuned to a frequency different from said signal frequency, and signal utilization means connected to said output circuit.

12. In a super-regenerative receiving circuit, in combination, a plurality of electron discharge devices having anode, cathode and control electrodes, an input circuit coupled to the control electrodes of said devices including a signal collecting circuit for applying signal waves to said devices out of phase with respect to one another, an output circuit for said devices, a coupling arrangement between said output and input circuits comprising a feed back coil in said output circuit, a filter circuit electromagnetically coupled to said feed back coil and said input circuit, said filter circuit passing maximum energy at frequencies on either side of the signal frequency, and signal utilization means connected to said output circuit.

13. In a super-regenerative receiving circuit, in combination, a plurality of electron discharge devices having anode, cathode and control electrodes, an input circuit coupled to the control electrodes of said devices including a signal collecting circuit for applying signal waves to said devices out of phase with respect to one another, an output circuit for said devices, a coupling arrangement between said output and input circuits comprising a feed back coil in said output circuit, a filter circuit electromagnetically coupled to said feed back coil and said input circuit, said filter circuit passing maximum energy at frequencies on either side of the signal frequency, parallel resonant circuits in said input and output circuits which are resonant to a frequency lower than said signal frequency, and signal utilization means connected to said output circuit.

14. A super-regenerative receiving circuit comprising two electron discharge devices in push-pull relationship with respect to one another, a common input circuit for said devices for simultaneously impressing signal waves thereto in a differential manner, one of said devices being arranged to give regeneration of the signal waves and the other of said devices being arranged to quench the oscillations of said first device, characterized in this, that the last mentioned device comprises a quenching frequency oscillator whose output is coupled to said common input circuit.

15. In a super-regenerative receiving circuit, in combination, a plurality of electron discharge devices having anode, cathode and control electrodes, an input circuit coupled to the control electrodes of said devices including a signal collecting circuit for applying signal waves to said devices in a differential manner, an output circuit for said devices coupled to said input circuit by a feed-back coil, parallel resonant circuits in said input and output circuits which are resonant to a frequency lower than said signal frequency, and signal utilization means connected to said output circuit, said parallel resonant circuits being coupled together.

16. In a super-regenerative receiver, in combination, an input circuit for receiving signal oscillations, two electron discharge devices each having anode, cathode and control electrodes, a parallel resonant circuit comprising a first condenser in parallel relation to a series combination of two coils separated by a second condenser, said resonant circuit being tuned substantially to the frequency of the signal oscillations and connected between the control electrodes of said devices, said input circuit being coupled to said two coils, whereby the signal oscillations are applied differentially to said control electrodes, another coil in parallel to said second condenser and comprising with said condenser a second resonant circuit tuned to a frequency lower than the frequency of said signal oscillations, a third parallel resonant circuit tuned to the same frequency as said second resonant circuit located between said anodes, said second and third resonant circuits being coupled together, and a feed-back coil coupling said anodes to said first parallel resonant circuit which is tuned to the signal oscillations.

17. A super-regenerative receiver in accordance with claim 16, including a resistance connected across the terminals of said other coil of said second resonant circuit, and a grid leak connected to the center of said resistance.

18. A super-regenerative receiver in accordance with claim 16, including a biasing resistor connected effectively between the center of said other coil and the cathodes of said devices.

19. A super-regenerative receiver in accordance with claim 16, including a resistive connection between the center of said other coil and ground, and another connection between the electrical center of said second condenser and ground.

R. W. GEORGE.